United States Patent [19]

Maeda et al.

[11] Patent Number: 5,466,739
[45] Date of Patent: Nov. 14, 1995

[54] WATER-BASED MASKANT COMPOSITION AND CHEMICAL MILLING METHOD USING THE SAME

[75] Inventors: Tukasa Maeda; Yasuhiko Sasagawa; Yorinobu Ikeda; Teruo Hiraharu, all of Yokkaichi, Japan

[73] Assignee: Japan Synthetic Rubber Co., Ltd., Tokyo, Japan

[21] Appl. No.: 323,056

[22] Filed: Oct. 14, 1994

Related U.S. Application Data

[63] Continuation of Ser. No. 53,391, Apr. 28, 1993, abandoned.

[30] Foreign Application Priority Data

| Apr. 28, 1992 | [JP] | Japan | 4-135879 |
| Sep. 24, 1992 | [JP] | Japan | 4-279347 |

[51] Int. Cl.⁶ ............... C08K 3/34; C08L 9/08; C08L 7/02
[52] U.S. Cl. ............. 524/525; 524/451; 524/501; 524/571; 524/575.5; 524/503; 524/926
[58] Field of Search ............... 524/451, 501, 524/571, 575.5, 926, 503, 525

[56] References Cited

U.S. PATENT DOCUMENTS

| 2,610,163 | 12/1948 | Te Grotenhuis | 524/501 |
| 3,892,701 | 7/1975 | Burke, Jr. | 524/571 |
| 3,928,281 | 12/1975 | Uchigaki et al. | 524/451 |
| 3,996,181 | 12/1976 | Hayashi et al. | 524/503 |
| 4,206,007 | 6/1980 | Force | 156/72 |
| 4,350,723 | 9/1982 | Sugimura et al. | 524/501 |
| 4,373,050 | 2/1983 | Steinbrecher et al. | 524/405 |
| 4,471,082 | 9/1984 | Kwok et al. | 524/571 |
| 4,722,954 | 2/1988 | Hallworth | 524/571 |
| 4,806,390 | 2/1989 | Hawker et al. | 524/446 |
| 4,946,711 | 8/1990 | Hawker et al. | 524/446 |

FOREIGN PATENT DOCUMENTS

| 0517983 | 12/1992 | European Pat. Off. . | |
| 49-54435 | 5/1974 | Japan . | |
| 0763394 | 9/1980 | U.S.S.R. | 524/501 |

*Primary Examiner*—Paul R. Michl
*Assistant Examiner*—Andrew E. C. Merriam
*Attorney, Agent, or Firm*—Oblon, Spivak, McClelland, Maier & Neustadt

[57] ABSTRACT

A water-based maskant composition and a chemical milling method using the maskant composition. Said water-based maskant composition comprises 100 parts by weight (as solids) of a latex constituent consisting of (a) 5–60 parts by weight (as solids) of a copolymer latex obtained by emulsion-polymerization of a monomer mixture consisting of 30–70% by weight of an aliphatic conjugated diene compound, 20–70% by weight of an aromatic vinyl compound, 0–10% by weight of an ethylenically unsaturated carboxylic acid and 0–50% by weight of a vinyl compound copolymerizable therewith and (b) 95–40 parts by weight (as solids) of a natural rubber latex; 10–500 parts by weight of a filler; and 0.1–10 parts by weight of a thickener, wherein the vicosity at 25° C. is 500–5,000 cps as measured by BH type rotor at 20 rpm at a solids concentration of 50% by weight, the pH is 7–9 and the tensile strength and elongation of a film obtained from the composition are 50–150 kgf/cm² and 100–800%, respectively, as measured according to JIS K 6301.

10 Claims, 1 Drawing Sheet

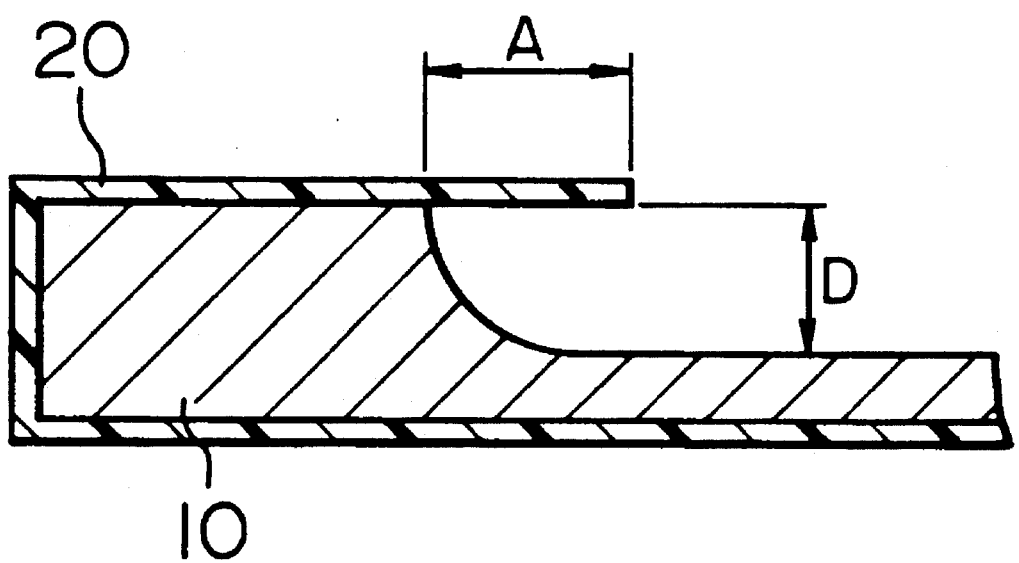

WATER-BASED MASKANT COMPOSITION AND CHEMICAL MILLING METHOD USING THE SAME

This application is a continuation of application Ser. No. 08/053,391, filed on Apr. 28, 1993, now abandoned.

BACKGROUND OF THE INVENTION

This invention relates to a water-based maskant composition which is excellent in coatability, excellent in film strength and mask-dimension precision during etching, excellent in mask-removing workability, and also free from problems of environmental hygiene because of no generation of detrimental gases, and to a chemical milling method using the water-based maskant composition.

Metal chemical milling is well known in which strong acids or bases are used to etch away the unneeded portions of a metal article. In particular, in aircraft industries, reduction of the weight of aircraft parts has been required and the metal chemical milling has been used therefor.

The metal chemical milling is usually conducted by the following steps:

(1) A mask resistant to an etching bath to be used is formed on the base metal by a means such as immersion or the like.

(2) The mask thus formed is scribed using an appropriate template, to allow the desired portions of the mask to be peeled away to selectively expose the metal portions to be etched.

(3) Subsequently, the exposed metal portions are etched away with an etchant such as an alkali bath for aluminum parts or an acid bath for titanium parts.

(4) The mask is removed.

Heretofore, however, the maskant composition used in the above metal chemical milling method has been a rubber solution obtained by dissolving a rubber in an organic solvent, for example, toluene/xylene or perchloroethylene (see U.S. Pat. Nos. 3,380,863, 3,649,584 and the like).

Accordingly, in the course of applying and drying the maskant composition, the organic solvent is evaporated and, as a result, serious problems are caused in respect of environmental hygiene such as odor, air pollution and the like.

Recently, research has thus been made on use of a water-based maskant composition which is free from organic solvent and comprises an aqueous rubber latex as a main component in place of the above rubber solution.

Examples in which such aqueous rubber latexes are used are those of U.S. Pat. Nos. 4,373,050, 4,806,390, 4,946,711, EP 517,983 (corresponding to U.S. Ser. No. 713,165) and the like.

In U.S. Pat. No. 4,373,050, there is used a water-based acidic coating composition in which particles of a polymer such as styrene-butadiene copolymer, acrylonitrile-butadiene copolymer, polyethylene, polyacrylic acid or the like are dispersed; in U.S. Pat. Nos. 4,806,390 and 4,946,711, a neoprene latex is used; and in EP 517,983, a mixture of styrene-butadiene latex and neoprene latex is used.

However, when the above water-based maskant compositions are used, it has been impossible to sufficiently solve the following problems:

(a) The circumferential portions of the mask tend to be swollen with an alkali bath which is an etchant, and it is impossible to conduct chemical milling with high dimension precision.

(b) Since the coatability of the water-based maskant composition is poor, the coating workability is inferior.

(c) The peelability of mask is poor, and hence, the mask-removing workability is inferior.

SUMMARY OF THE INVENTION

The inventors of this invention have extensive study in order to solve the above-mentioned problems of prior art, and as a result, have found a novel water-based maskant composition which is excellent in coatability, in mask-dimension precision during etching and in mask-peelability, and is free from problems of environmental hygiene such as air pollution and the like and also found that when chemical milling is conducted using the water-based maskant composition the high precision etching of a metal can be conducted at a high efficiency.

According to this invention, there is provided a water-based maskant composition which comprises 100 parts by weight (as solids) of a latex constituent consisting of (a) 5–60 parts by weight (as solids) of a copolymer latex obtained by emulsion-polymerizing a monomer mixture of 30–70% by weight of an aliphatic conjugated diene compound, 20–70% by weight of an aromatic vinyl compound, 0–10% by weight of an ethylenically unsaturated carboxylic acid and 0–50% by weight of a vinyl compound copolymerizable therewith and (b) 95–40 parts by weight (as solids) of a natural rubber latex; 10–500 parts by weight of a filler; and 0.1–10 parts by weight of a thickener, wherein the viscosity at 25° C. is 500–5,000 cps as measured by means of BH type rotor at 20 rpm at a solids concentration of 50% by weight, the pH is 7–9, the tensile strength and elongation of a film obtained from the composition are 50–150 kgf/cm$^2$ and 100–800%, respectively, as measured according to JIS K 6301.

This invention also provides a chemical milling method which comprises the steps of applying the above water-based maskant composition to a metal, drying the applied composition to form a mask, scribing the unneeded portions of mask, chemically etching the unmasked portions of metal and then removing the mask.

BRIEF DESCRIPTION OF THE DRAWING

The accompanying drawing is an explanatory view for indicating etching factor F in which 10 refers to an aluminum base plate, 20 to a mask, A to the undercut amount and D to the etching depth.

DETAILED DESCRIPTION OF THE INVENTION

First of all, an explanation is made of the compounds to be used in the preparation of the copolymer latex which is the component (a) of the latex constituent which is one of the constituents of the water-based maskant composition of this invention.

The aliphatic conjugated diene compound includes 1,3-butadiene, 2-methyl-1,3-butadiene, 2,3-dimethyl-1,3-butadiene, 2-neopentyl-1,3-butadiene, 2-chloro-1,3-butadiene, 2-cyano-1,3-butadiene and the like. Of these, 1,3-butadiene is preferred. The aliphatic conjugated diene compounds may be used alone or in combination of two or more.

The proportion of the aliphatic conjugated diene compound used is 30–70% by weight, preferably 35–65% by weight, and more preferably 40–60% by weight, based on the total weight of the monomer mixture used in the component (a) of the latex constituent. When the amount of the aliphatic conjugated diene compound used is less than 30% by weight, the coatability of the water-based maskant composition obtained is so poor that the resulting coating film becomes too hard and hence is inferior in peelability, and the mask-removing workability becomes inferior. On the other hand, when the amount of the aliphatic conjugated diene compound used exceeds 70% by weight, the coatability is so poor that the resulting coating film becomes too soft and hence is elongated when being peeled, and the mask-removing workability is inferior.

The aromatic vinyl compound includes styrene, α-methylstyrene, p-methylstyrene, viyltoluene, chlorostyrene and the like. In particular, styrene is preferred. The aromatic vinyl compounds may be used alone or in combination of two or more.

The proportion of the aromatic vinyl compound used is 20–70% by weight, preferably 25–65% by weight, and more preferably 30–60% by weight, based on the total weight of the monomer mixture used in the component (a). When the amount of the aromatic vinyl compound used is less than 20% by weight, the coatability is so poor that the resulting coating film becomes too soft and hence is elongated when being peeled, and the mask-removing workability is inferior. On the other hand, when the amount of the aromatic vinyl compound used exceeds 70% by weight, the coatability is so poor that the resulting coating film becomes too hard and hence the peelability is inferior, and the mask-removing workability is inferior.

The ethylenically unsaturated carboxylic acid includes, for example, itaconic acid, acrylic acid, methacrylic acid, fumaric acid, maleic acid, maleic anhydride, fumaric anhydride and the like. The ethylenically unsaturated carboxylic acids may be used alone or in combination of two or more. The ethylenically unsaturated carboxylic acid may be neutralized with an alkali metal such as sodium, potassium or the like.

The amount of the ethylenically unsaturated carboxylic acid used is 0–10% by weight, preferably 0–8% by weight, and more preferably 0.1–8% by weight, based on the total weight of the monomer mixture used in the component (a). The ethylenically unsaturated carboxylic acid is used mainly for obtaining a good polymerization stability, and serves for enhancing the mask-dimension precision. However, when the amount of the ethylenically unsaturated carboxylic acid exceeds 10% by weight, the water resistance of the resulting coating film becomes lower, so that a mask having excellent alkali resistance cannot be obtained and the maskant composition lacks practicability.

In addition, if necessary, other copolymerizable vinyl compounds than the above monomers can be copolymerized, which include, for example, alkyl (meth)acrylates such as methyl acrylate, ethyl acrylate, butyl acrylate, methyl methyacrylate, ethyl methacrylate, butyl methacrylate, 2-ethylhexyl methacrylate and the like; vinyl vyanide compounds; ethylenically unsaturated carboxylic acid amides; etc. Among them, alkyl (meth)acrylates serve for enhancing the coatability.

The copolymer latex which is the component (a) is a latex obtained by emulsion-polymerization of the above monomer mixture using a known emulsifier, polymerization initiator, chain transfer agent and the like.

The emulsifier includes anionic emulsifiers such as sodium dodecylbenzenesulfonate, sodium laurylsulfate, sodium diphenyl ether disulfonate, sodium dialkyl succinataesulfonate and the like; nonionic emulsifiers such as polyoxyethylene alkyl esters, polyoxyethylene alkyl aryl ethers and the like; amphoteric emulsifiers; fluorine-containing surfactants; and the like. These may be used alone or in combination of two or more.

The amount of the emulsifier used is preferably 0.5–10% by weight, more preferably 1–8% by weight, based on the weight of the total weight of the monomer mixture used.

The polymerization initiator includes inorganic initiators, for example, persulfate type initiators such as potassium persulfate, ammonium persulfate and the like; hydrogen peroxide; and the like, and organic initiators, for example, organic peroxides such as cumene hydroperoxide, isopropylbenzene hydroperoxide, para-menthane hydroperoxide, benzoyl peroxide and the like and azo type initiators such as azoisobutyronitrile and the like.

The amount of the polymerization initiator used is preferably 0.03–2% by weight, more preferably 0.05–1% by weight, based on the total weight of the monomer mixture used. Incidentally, in order to accelerate the emulsion-polymerization, there may be used together therewith a reducing agent such as sodium pyrobisulfite, sodium sulfite, sodium hydrogensulfite, ferrous sulfate, glucose, formaldehyde-sodium sulfoxylate, L-ascorbic acid or its salt or the like; or a chelating agent such as glycine, alanine, sodium ethylenediamine tetracetate or the like.

The chain transfer agent includes α-methylstyrene dimer, terpinolene, α-terpinene, γ-terpinene, dipentene, octylmercaptan, n-dodecylmercaptan, t-todecylmercaptan, n-hexadecylmercaptan, diethylxanthogene disulfide, dimethylxanthogene disulfide, diisopropylxanthogene disulfide, tetramethylthiuram monosulfide, tetraethylthiuram disulfide, tetrabutylthiuram disulfide, dipentamethylthiuram disulfide and the like. These may be used preferably in a proportion of 0–15% by weight based on the total weight of the monomer mixture used.

In the emulsion polymerization, if necessary, various electrolytes, pH-controlling agents and the like may be used along with the above-mentioned emulsifier, polymerization initiator and chain transfer agent. It is preferable to add, to 100–300 parts by weight of water, 100 parts by weight of the above monomer mixture and the above-mentioned emulsifier, polymerization initiator and chain transfer agent in amounts falling within the above-mentioned ranges and subject the resulting mixture to emulsion polymerization at a temperature of 10°–90° C., more perferably 40°–80° C., for a period of 5–40 hours.

The average particle diameter of the copolymer latex which is the component (a) used in this invention is preferably 500–3,000 Å, more perferably 1,000–2,500 Å. The term "average particle diameter" used herein means a number average of values obtained by treating copolymer latex with osmic acid, taking an electron microphotograph thereof at a magnification of 60,000 and then measuring the diameters of at least 100 particles.

When the average particle diameter of the copolymer latex particles exceeds 3,000 Å, the permeability of the alkali bath as an etchant into the coating film becomes greater and the performance of the mask becomes poor. On the other hand, when it is less than 500 Å, such a tendency appears that the viscosity of the water-based maskant composition becomes high and the coatability becomes inferior.

Moreover, the gel content of the copolymer latex which is the component (a) is preferably 20–90% by weight, more preferably 30–85% by weight. The term "gel content" used herein means the ratio of the weight of the solids obtained by drying the copolymer latex to make a film, dissolving the resulting film in toluene, filtering the solution to separate the undissolved matter and further removing the toluene from the undissolved matter to the total solids weight [(the weight of toluene-insolubles)/(the weight of film obtained upon drying)×100 (%)]. When the gel content of the copolymer latex exceeds 95% by weight there is a tendency that the permeability of an alkali bath becomes great, and the performance of mask becomes bad.

A further explanation is made of the natural rubber latex which is the component (b) used in this invention.

The original liquid of the natural rubber latex is a sol in which rubber particles are dispersed in a serum, and the rubber content in the natural rubber latex is generally 30–40% by weight. In addition, non-rubber components, namely, protein, sugar, resins, amino acid, enzymes and the like are contained in small amounts. A part thereof is complexly combined with the rubber particles.

The natural rubber latex which is the component (b) is prepared by centrifugalizing the original liquid of the natural rubber latex to concentrate the rubber content to 60–70% by weight, and adding to the concentrated latex a sufficient amount of ammonia or other storing agents in order to make it resistant to long term storage or transportation.

The proportion of the copolymer latex (component (a)) to the natural rubber latex (component (b)) is such that the component (a) is 5–60% by weight (as solids), preferably 20–50% by weight (as solids), particularly preferably 20–40% by weight (as solids) and the component (b) is 40–95% by weight (as solids), preferably 50–90% by weight (as solids), particularly preferably 50–80% by weight (as solids), based on the weight of the latex constituent (as solids).

When the proportion of the component (b) to the latex constituent (as solids) is less than 40% by weight (as solids), the peelability of mask, mask-removing workability and dimension precision during chemical milling are not satisfactory, while when it exceeds 95% by weight, the discoloration of the surface of aluminum to which the latex has been applied occurs remarkably and the coatability of the water-based maskant composition becomes inferior.

In preparing the water-based maskant composition of this invention, the filler and thickener are mixed with a mixed latex of the copolymer latex (component (a)) and the natural rubber latex (component (b)) and, if necessary, a defoaming agent, film-forming aid and the like are added thereto.

The filler includes calcium carbonate, talc, clay, aluminum hydroxide, magnesium carbonate, magnesium hydroxide, barium hydroxide, silica sand and the like, and talc is preferred.

The amount of the filler used is 10–150 parts by weight, preferably 20–150 parts by weight, more preferably 30–100 parts by weight, per 100 parts by weight (as solids) of the latex constituent consisting of the copolymer latex (component (a)) and the natural rubber latex (component (b)).

When the amount of the filler is less than 10 parts by weight, a sufficient film thickness cannot be obtained unless immersion is repeated many times when a coating film is formed and the coating workability is inferior. On the other hand, when it exceeds 150 parts by weight, the coating film becomes too hard and the peelability of mask becomes bad.

The thickener includes polyvinyl alcohol, sodium, calcium and ammonium salts of polycarboxylic acid, cross-linking type acrylic emulsion and carboxymethylcellulose, and polyvinyl alcohol is preferred.

In particular, it is preferable that the polyvinyl alcohol has a molecular weight of 500–100,000.

The amount of the thickener used is 0.1–10 parts by weight, preferably 1–3 parts by weight, per 100 parts by weight (as solids) of the latex constituent.

When the amount of the thickener is less than 0.1 part by weight, the viscosity is too low and the film-forming property is inferior. On the other hand, when it exceeds 10 parts by weight, the viscosity becomes too high and the film-forming property becomes inferior.

The film-forming aid includes toluene, carbitol, Cellosolve, chloroform, acetone, tributoxyethyl phosphate, dibutyl phthalate, dioctyl phthalate and the like, and the defoaming agent includes those of the silicon type, emulsion type, polyether type and ester type.

The amount of the film-forming aid used is preferably 0.1–30 parts by weight, more preferably 5–20 parts by weight, per 100 parts by weight (as solids) of the latex constituent consisting of the copolymer latex (component (a)) and the natural rubber latex (component (b)).

When the amount of the film-forming aid used is less than 0.1 part by weight, the performance of mask and the appearance of finished mask are inferior. On the other hand, when the amount exceeds 30 parts by weight, a problem of odor occurs when a coating film is formed and the viscosity of the water-based maskant composition becomes high, so that the property as a coating film tends to become inferior.

When the amount of the defoaming agent used is less than 0.01 part by weight, the defoaming property of the water-based maskant composition becomes inferior, while when it exceeds 5% by weight, the defoaming property becomes too strong, so that a so-called cissing occurs on the mask surface, and the peelability tend to become too high in part.

In this invention, the total solids concentration of the water-based maskant composition is usually 10–80% by weight, preferably 30–70% by weight.

In this invention, the pH of the water-based maskant composition is 7–9. When the pH is less than 7, the stability of the water-based maskant composition and the blending stability thereof are inferior, and when the pH exceeds 9, contamination of the aluminum plate surface due to alkali is caused and, in addition, the adhesion between aluminum and aluminum is adversely affected.

In this invention, the viscosity of the water-based maskant composition is 500–5,000 cps, preferably 1,500–3,000 as measured at 25° C. at a solids concentration of 50% by weight by means of a BH type rotor at 20 rpm.

When the viscosity is less than 500 cps, the water-based maskant composition is inferior in stability, and the coatability thereof on a metal becomes unsatisfactory. On the other hand, when the viscosity exceeds 5,000 cps, the workability during coating becomes inferior, so that the control of film thickness during the immersion becomes difficult.

In this invention, when the water-based maskant composition is formed into a film the film has a tensile strength of 50–150 kgf/cm$^2$ preferably 70–110 kgf/cm$^2$. The term "tensile strength" used herein means a value obtained by coating the water-based maskant composition having a solids concentration of 50% by weight on a glass plate in a dried film thickness of 350 μm, allowing the composition to stand at room temperature for 48 hours, then peeling the film from the glass plate surface, heat-treating the film at 120° C. for 30 minutes, and then subjecting the film to measurement of the tensile strength according to the tensile test defined in the vulcanized rubber physical test method of JIS K 6301.

When the tensile strength of film of the water-based maskant composition is less than 50 kgf/cm$^2$, the coating film becomes too soft, the peelability of mask becomes poor. When the tensile strength exceeds 150 kgf/cm$^2$, the coating film becomes too hard, and the peelability of mask becomes poor.

In this invention, the elongation of the film obtained from the water-based maskant composition is 100–800%. The term "elongation" used herein means a value obtained by forming a film in the same manner as in the case of tensile strength, and subjecting the film to measurement of elongation according to the tensile test defined in the vulcanized rubber physical test method of JIS K 6301.

When the elongation of film is less than 100%, the coating film becomes too hard and the peelability of mask becomes inferior. Also, the elongation of film exceeds 800%, the coating film becomes too soft, and the peelability of film becomes inferior.

In the preparation of the water-based maskant composition of this invention, toluene, carbitol, a plasticizer such as dioctyl phthalate or the like, zinc white, a cross-linking agent of the epoxy type, melamine type or thiourea type may be blended with the composition.

In this invention, the water-based maskant composition obtained above is applied usually in a thickness of 100–800 μm, preferably 200–600 μm to a metal to be masked.

The metal which can be used in this invention includes aluminum, iron and the like, and the composition of this invention is the most suitable to chemical milling of aluminum.

The method of applying the water-based maskant composition to a metal includes a spray method, a roll coater method, an immersion method and the like, and the immersion method is simple.

In this invention, the specific water-based maskant composition is used, and therefore, it is possible to coat a metal plate with the composition in the desired thickness by one immersion of the metal in the maskant composition.

Subsequently, the coating film is dried and the unneeded portions of the resulting mask are scribed away to form a mask on the needed portions of metal. In this invention, the coating film can be dried at room temperature, though it may be heated at about 50°–120° C. Also, the coating film can be dried by far infrared rays.

After a mask has been formed on the needed portions of metal, the masked metal is immersed in an etchant suitable to the metal to remove the unneeded portions of the metal. For example, an aqueous alkali solution is used as an etchant for aluminum. Usually, the aqueous alkali solution is an about 20% by weight solution of sodium hydroxide in water.

After the removal of the unneeded portions of metal, the metal may, if necessary, be subjected to washing, rinsing and the like.

After completion of the etching, the mask is removed from the metal, and if necessary, the same procedure as above may be repeated further.

In the chemical milling method of this invention, there is used a water-based maskant composition which is excellent in coatability and free from environmental hygiene problem such as air pollution and the mask derived from which has an suitable tensile strength and elongation and a good adhesion though being excellent in mask-removing workability, and therefore, high precision etching can be conducted at a good efficiency.

The chemical milling method using the water-based maskant composition of this invention is also suitable for multiple chemical milling processing. The multiple chemical milling processing means a method to be used in the production of parts having partially different thicknesses such as door part of aircraft, in which method the mask formed is scribed step-by-step and etching is repeated. In this multiple chemical milling processing the first formed mask is used until the last stage while being scribed little by little, so that unless the water-based maskant composition of this invention having good adhesion is used high precision etching cannot be achieved.

DESCRIPTION OF PREFERRED EMBODIMENTS

This invention is further explained below in more detail referring to Examples, which are merely by way illustration and not by way of limitation.

In the Examples, parts and percentages are by weight unless otherwise specified.

EXAMPLES 1 TO 4 AND COMPARATIVE EXAMPLES 1 TO 11

(1) Copolymer latex (a), natural rubber latex (b) and other latexes (i) Preparation of copolymer latex (a)

Copolymer Latex a1

Into a 100-liter stainless steel reactor were charged 100 parts of a monomer mixture consisting of 40 parts of butadiene and 60 parts of styrene; 3 parts of sodium dodecylbenzenesulfonate, 5 parts of t-dodecylmercaptan; 0.5 part of ammonium persulfate; 0.01 part of sodium ethylenediamine tetracetate and 150 parts of water, and the resulting mixture was subjected to emulsion polymerization at a polymerization temperature of 40°–60° C. for 20 hours to obtain a copolymer latex (referred to hereinafter as Copolymer Latex a1). The polymerization conversion was 98% or more.

Copolymer Latex a2

The same procedure as above was repeated, except that the monomer mixture consisted of 85 parts of butadiene, 13 parts of styrene and 2 parts of acrylic acid, to obtain a copolymer latex (referred to hereinafter as Copolymer Latex a2). The polymerization conversion was 98% or more.

Copolymer Latex a3

The same procedure as in the case of Copolymer Latex a1 was repeated, except that the monomer mixture consisted of 25 parts of butadiene, 73 parts of styrene and 2 parts of acrylic acid, to obtain a copolymer latex (referred to hereinafter as Copolymer Latex a3). The polymerization conversion was 98% or more.

(ii) Natural rubber latex (b)

Natural Rubber Latex b1: A natural rubber latex having a solids concentration of 60.5% and a pH of 9.8.

Natural Rubber Latex b2: A natural rubber latex having a solids concentration of 60.5% and a pH of 10.5.

(iii) Other latexes

As chloroprene latex, Neoprene Latex 842A (a trade name of dupont) was used.

As polyvinylidene chloride latex, Hycar 2600X 91 (a trade name of B. F. Goodrich) was used.

(2) Preparation of water based maskant composition

To 100 parts (as solids) of a latex constituent consisting of one of Copolymer Latexes a1 to a3, one of Natural Rubber Latexes b1 and b2 and one of the other latexes mentioned above in the proportions shown in Table 1 or 2 were added successively a filler (talc slurry) and an alkali-soluble thickener (polyacrylic acid) in the amounts shown in Table 1 or 2. The resulting mixture was stirred to prepare a water-based maskant composition.

The viscosity of the composition was measured and the tensile strength and elongation of a film obtained from the composition were measured to obtain the results shown in Table 1 or 2.

(3) Chemical milling

An aluminum base plate having a size of 50 cm ×10 cm was immersed in each of the water-based maskant compositions obtained, to coat the aluminum base palte with the composition so that the dry film thickness at room temperature was 400 µm, after the resulting assembly was dried and then heat-treated at 80° C. for 60 minutes. The unneeded portions of coating film were scribed to form a desired pattern mask. Subsequently, the masked aluminum base plate was immersed in an aqueous sodium hydroxide solution at 90° C. for 3 hours to etch away the unmasked aluminum.

After the etching, the masked aluminum plate was taken out of the aqueous sodium hydorxide solution and then washed with water, after which the mask was removed from the aluminum base palte.

(4) Multiple chemical milling

After completion of the chemical milling in (3) above, the unneed portions of mask were further scribed and then etching was effected. Said scribing and etching step was repeated 5 times to conduct the multiple etching of aluminum plate.

The above chemical milling and multiple chemical milling were evaluated for the following matters:

1. Coatability

The state of the mask after the immersion in the aqueous sodium hydroxide solution for 3 hours was observed. When a uniform mask having a constant thickness and free from cracks and brister was formed, this mask was evaluated "good", and when the mask had unevenness, brister and cracks, the mask was evaluated "bad".

2. Etching factor

Etching factor (F) was measured. The term "etching factor" used herein means a value indicated by F=A/D in which F is an etching factor, A is an undercut amount and D is an etching depth in the accompanying Figure. In the Figure, 10 refers to an aluminum plate, and 20 to a mask.

The F value varies depending upon the kind of etchant, materials constituting the mask plate, heat-treatment conditions, adhesion of mask, film thickness and the like, and it can be said that the smaller the F value, the higher the dimension precision of mask.

3. Peeling strength

After the etching, the aluminum base plate was cut in a width of 1 inch and the peeling strength of mask was measured by means of an autograph.

In the chemical milling method, the peeling strength of mask is preferably 300–600 kgf/cm$^2$. When the peeling strength of mask is less than 300 kgf/cm$^2$, the adhesion of the mask to the metal plate becomes poor, and it becomes impossible to sufficiently protect the masked portions of metal from the etchant. On the other hand, when the peeling strength of mask exceeds 600 kgf/cm$^2$, it becomes impossible to easily remove the mask from the metal plate, and in some cases, a part of mask remains unremoved on the metal plate.

Comparative Example 1 is an example in which the amount of the natural rubber latex is smaller than the scope of this invention, and is inferior in peelability, dimension precision and film strength.

Comparative Example 2 is an example in which the amount of the natural rubber latex is larger than the scope of this invention, and is inferior in coatability. The surface of aluminum in Comparative Example 2 was discolored as compared with the Examples though this is not shown in Table 1.

Comparative Example 3 is an example of SB latex/natural rubber latex combination in which the viscosity was less than 500 cps, and is inferior in coatability.

Comparative Example 4 is an example of SB latex/natural rubber latex combination in which the viscosity exceeds 5,000 cps and is inferior in coatability.

Comparative Example 5 is an example of SB latex/natural rubber latex combination in which the tensile strength is less than 50 kgf/cm$^2$, and is inferior in peelability.

Comparative Example 6 is an example of SB latex/natural rubber latex combination in which the tensile strength is 150 kgf/cm$^2$, and is inferior in coatability and peelability.

Comparative Example 7 is an example in which chloroprene latex/polyvinyldene chloride latex was used (the example of U.S. Pat. No. 4,806,390), and is inferior in peelability and mask-dimension precision.

Comparative Example 8 is an example in which SB latex/chloroprene latex was used (the example of EP 517,983), and is inferior in mask-dimension precision.

Comparative Example 9 is an example in which only SB latex was used (an example of U.S. Pat. No. 4,373,050), and is inferior in mask-dimension precision.

Comparative Example 10 is an example in which only polyethylene latex was used (another example of U.S. Pat. No. 4,373,050), and is inferior in mask-dimention precision.

Comparative Example 11 is an example in which only acrylic copolymer latex was used (a further example of U.S. Pat. No. 4,373,050) and is inferior in peelability and mask-dimension precision.

TABLE 1

| | Example No. | | | |
|---|---|---|---|---|
| | 1 | 2 | 3 | 4 |
| Maskant composition (parts) | | | | |
| Copolymer Latex a1 | 50 | 60 | 40 | 50 |
| Copolymer Latex a2 | — | — | — | — |
| Copolymer Latex a3 | — | — | — | — |
| Natural Rubber Latex b1 | 50 | 40 | 60 | — |
| Natural Rubber Latex b2 | — | — | — | 50 |
| Chloroprene latex | — | — | — | — |
| Polyvinylidene chloride latex | — | — | — | — |
| Acrylic copolymer latex | — | — | — | — |
| Filler | 70 | 70 | 50 | 90 |
| Thickener | 2 | 2 | 3 | 1.5 |
| pH | 8.9 | 8.8 | 9.0 | 9.0 |
| Tensile strength (kgf/cm$^2$) | 120 | 100 | 160 | 120 |
| Elongation (%) | 320 | 300 | 360 | 330 |
| Viscosity (cps) | 2400 | 2140 | 2730 | 2330 |
| Evaluation (chemical milling) | | | | |
| Coatability | Good | Good | Good | Good |
| Peeling strength (g/inch) | 400 | 500 | 350 | 400 |
| Etching factor | 1.1 | 1.1 | 1.1 | 1.1 |
| Evaluation (multiple chemical milling) | | | | |
| Peeling strength (g/inch) | 420 | 510 | 380 | 410 |
| Etching factor | 1.2 | 1.1 | 1.1 | 1.2 |

TABLE 2

| | Comparative Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Maskant composition (parts) | | | | | | | | | | | |
| Copolymer Latex a1 | 70 | 1 | 60 | 60 | — | — | — | 60 | 100 | — | — |
| Copolymer Lates a2 | — | — | — | — | 60 | — | — | — | — | — | — |
| Copolymer Latex a3 | — | — | — | — | — | 60 | — | — | — | — | — |
| Natural Rubber Latex b1 | 30 | 99 | 40 | 40 | 40 | 40 | — | — | — | — | — |
| Natural Rubber Latex b2 | — | — | — | — | — | — | — | — | — | — | — |
| Chloroprene latex | — | — | — | — | — | — | 80 | 40 | — | — | — |
| Polyvinylidene chloride latex | — | — | — | — | — | — | 20 | — | — | — | — |
| Acrylic copolymer latex | — | — | — | — | — | — | — | — | — | 100 | 100 |
| Filler | 70 | 70 | 70 | 70 | 70 | 70 | 70 | 70 | 70 | 70 | 70 |
| Thickener | 2 | 2 | 0 | 20 | 2 | 2 | 2 | 2 | 2 | 2 | 2 |
| pH | 8.8 | 9.3 | 9.0 | 9.1 | 9.0 | 9.0 | 8.8 | 8.9 | 9.0 | 8.6 | 9.1 |
| Tensile strength (kgf/cm$^2$) | 40 | 60 | 110 | 105 | 40 | 200 | 200 | 100 | 40 | 160 | 40 |
| Elongation (%) | 240 | 900 | 340 | 320 | 1200 | 280 | 80 | 400 | 330 | 100 | 200 |
| Viscosity (cps) | 2200 | 2800 | 50 | 23000 | 2300 | 2400 | 2200 | 2200 | 2400 | 2300 | 2600 |
| Evaluation (chemical milling) | | | | | | | | | | | |
| Coatability | Good | Bad | Bad | Bad | Bad | Good | Good | Good | Good | Good | Good |
| Peeling strength (g/inch) | 700 | 200 | 400 | 380 | 200 | 600 | 1000 | 600 | 300 | 400 | 200 |
| Etching factor | 1.4 | 1.1 | 1.1 | 1.1 | 1.1 | 1.2 | 1.5 | 1.6 | 1.5 | 2.3 | 2.4 |
| Evaluation (multiple chemical milling) | | | | | | | | | | | |
| Peeling strength (g/inch) | 740 | 250 | 420 | 410 | 240 | 680 | 1200 | 690 | 350 | 420 | 280 |
| Etching factor | 1.7 | 1.2 | 1.3 | 1.2 | 1.2 | 1.4 | 1.8 | 1.8 | 1.8 | 2.6 | 2.8 |

What is claimed is:

1. A water-based maskant composition for chemical milling, which consists essentially of 100 parts by weight (as solids) of a latex constituent consisting of (a) 5–60 parts by weight (as solids) of a copolymer latex obtained by emulsion-polymerization of a monomer mixture consisting of 30–70% by weight of an aliphatic conjugated diene compound, 20–70% by weight of an aromatic vinyl compound, 0–10% by weight of an ethylenically unsaturated carboxylic acid and 0–50% by weight of a vinyl compound copolymerizable therewith and (b) 95–40 parts by weight (as solids) of a natural rubber latex; 10–500 parts by weight of talc; and 0.1–10 parts by weight of a thickener selected from the group consisting of polyvinyl alcohol, sodium salt of polycarboxylic acid, potassium salt of polycarboxylic acid, ammonium salt of polycarboxylic acid, cross-linking acrylic emulsion and carboxymethylcellulose, wherein the viscosity at 25° C. is 500–5,000 cps as measured by BH type rotor at 20 rpm at a solids concentration of 50% by weight, the pH is 7–9, and the tensile strength and elongation of a film obtained from the composition are 50–150 kgf/cm$^2$ and 100–800%, respectively, as measured according to JIS K 6301.

2. The water-based maskant composition according to claim 1, wherein the aliphatic conjugated diene compound is 1,3-butadiene, 2-methyl-1,3-butadiene, 2,3-dimethyl-1,3-butadiene, 2-neopentyl-1,3-butadiene, 2-chloro-1,3-butadiene or 2-cyano-1,3-butadiene.

3. The water-based maskant composition according to claim 1, wherein the proportion of the aliphatic conjugated diene compound is 40–60% by weight.

4. The water-based maskant composition according to claim 1, wherein the aromatic vinyl compound is styrene, α-methylstyrene, p-methylstyrene, vinyltoluene or chlorostyrene.

5. The water-based maskant composition according to claim 1, wherein the proportion of the aromatic vinyl compound is 30–60% by weight.

6. The water-based maskant composition according to claim 1, wherein the copolymer latex consists of 30–70% by weight of a conjugated diene and 30–70% by weight of an aromatic vinyl compound.

7. The water-based maskant composition according to claim 1, wherein the proportion of the component (a) is 20–40% by weight and the proportion of the component (b) is 50–80% by weight, based on the weight (as solids) of the latex constituent.

8. The water-based maskant composition according to claim 1, wherein the proportion of talc is 30–100 parts by weight.

9. The water-based maskant composition according to claim 1, wherein the proportion of the thickener is 1–3 parts by weight.

10. The water-based maskant composition according to claim 1, wherein the copolymer latex is of a monomer mixture which contains 0.1–8% by weight of an ethylenically unsaturated carboxylic acid.

* * * * *